United States Patent [19]

Mandelcorn

[11] Patent Number: 4,672,517
[45] Date of Patent: Jun. 9, 1987

[54] SWITCHED POWER SUPPLY OF THE FORWARD CONVERTER TYPE

[75] Inventor: Josh Mandelcorn, Los Angeles, Calif.

[73] Assignee: Pioneer Magnetics, Inc., Santa Monica, Calif.

[21] Appl. No.: 738,284

[22] Filed: May 28, 1985

[51] Int. Cl.⁴ .......................................... H02M 3/335
[52] U.S. Cl. ...................................... 363/20; 363/56; 363/17; 363/97; 363/98
[58] Field of Search .............................. 363/17, 20-21, 363/24-26, 56, 97-98, 131-132

[56] References Cited

U.S. PATENT DOCUMENTS

| | | | |
|---|---|---|---|
| 3,526,823 | 9/1970 | Genuit | 363/20 |
| 3,621,363 | 11/1971 | Ginnmann et al. | 363/20 |
| 3,935,526 | 1/1976 | Kamata et al. | 363/21 |
| 4,441,146 | 4/1984 | Vinciarelli | 363/56 X |
| 4,561,046 | 12/1985 | Kuster | 363/21 |

OTHER PUBLICATIONS

R. Severns, "Switchmode Converter Topologies–Make Them Work for You", Intersil, Inc., Jun. 1980.

Primary Examiner—Peter S. Wong
Attorney, Agent, or Firm—Keith D. Beecher

[57] ABSTRACT

A transformer isolated switched power supply of the forward converter type in which a small bias winding is provided on the transformer so that both sides of the operating area of the B/H curve of the transformer core may be used for increased efficiency.

6 Claims, 6 Drawing Figures

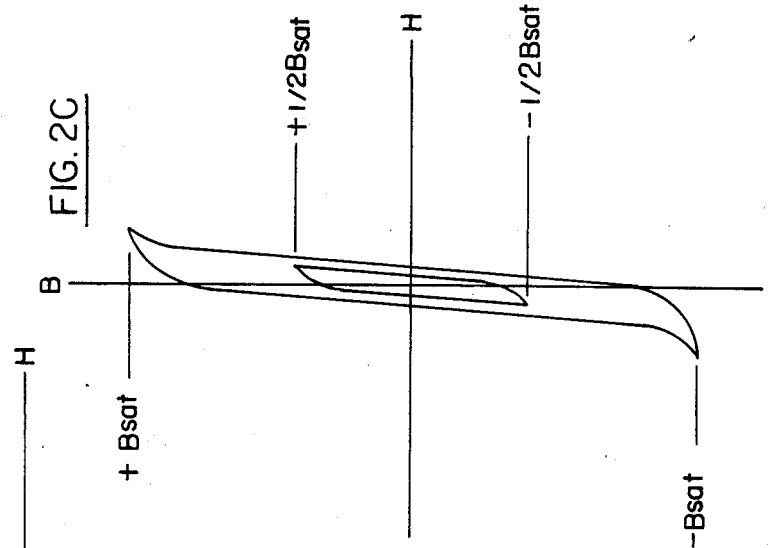
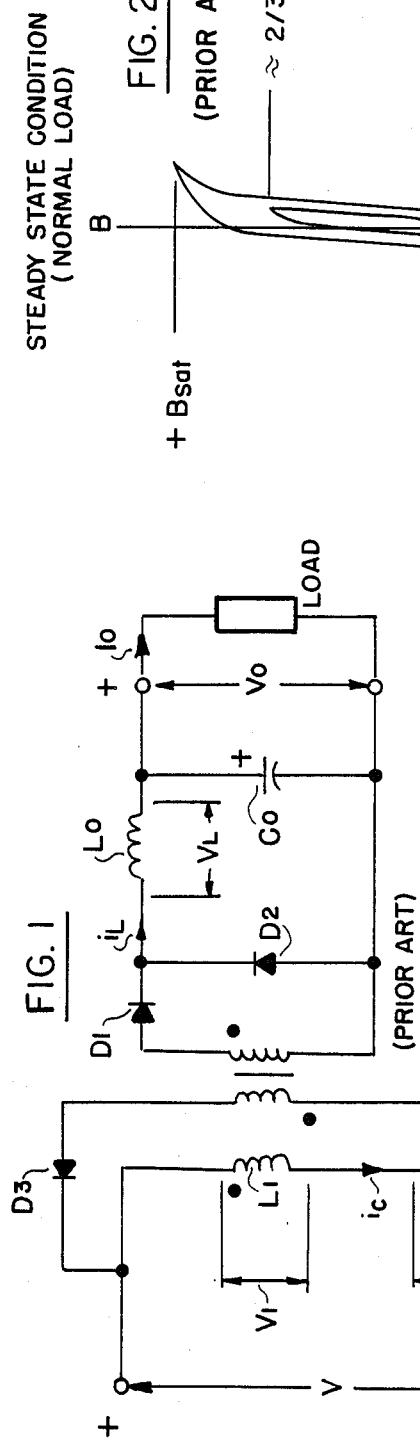
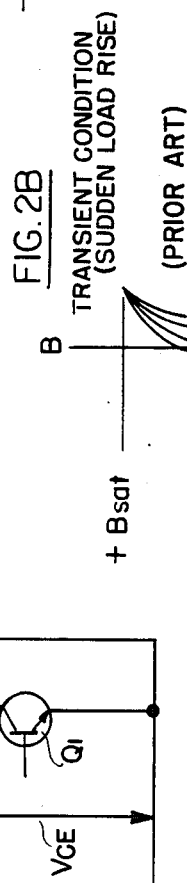

SWITCHED POWER SUPPLY OF THE FORWARD CONVERTER TYPE

BACKGROUND OF THE INVENTION

The development of the transformer isolated forward converter has resulted in improvements in switched power supplies. This is because the forward converter costs less than the other types of transformer/isolated switching power supplies, and it is easier to design. The forward converter has evolved into the double forward converter which provides output power in the kilowatt range, and which has a faster transient response and uses smaller components than the other types of switched power supplies.

The push-pull converter is the most widely used of the switched power supplies in the prior art, although it suffers the disadvantage of collector current peaking if its transformer saturates when there is a direct current unbalance or sudden rise in load. Attempts to prevent such collector current peaking in the prior art push-pull converter has led to circuit complexities.

The forward converter has output capabilities comparable with those of the push-pull converter, but it does not have the problems of direct current unbalance in the transformer core which are encountered in the push-pull converters. This is because transistor conductivity in the forward converter occurs only once for each cycle, and the core is reset during the off time of each cycle to a predictable flux level. In addition, there is less flux peaking in the output transformer of the forward converter than in the push-pull converter, and there is no interaction between the magnetizing and load currents. Moreover, the double forward converter utilizing two transformers is suitable for high power applications.

The forward converter and the double forward converter are described in detail in an article in Electronics, Feb. 2, 1978 entitled "Low Cost Forward Converters Ease Switching Supply Design" by Kees van Velthooven and Hugo Koppe.

BRIEF DESCRIPTION OF THE DRAWINGS

FIG. 1 is a circuit diagram of a typical prior art forward converter;

FIGS. 2A and 2B are representations of the B/H hysteresis loop of the core of the transformer in the circuit of FIG. 1 under steady state conditions and under transient conditions;

FIG. 2C is a diagram of the B/H hysteresis loop of the core of a forward converter incorporating the concepts of the present invention;

DETAILED DESCRIPTION OF THE ILLUSTRATED EMBODIMENTS

A typical prior art forward converter, such as described in the article referred to above, is shown in FIG. 1. The circuit of FIG. 1 is a one transistor (Q1) converter using a special three-winding transformer. A demagnetizing winding tightly coupled to the primary winding with diode D3 resets the transformer core when transistor Q1 is cut off, allowing transistor Q1 to become conductive in a subsequent cycle without saturating the core.

When transistor Q1 is switched on by a positive pulse at its base, diode D1 starts to conduct, and energy is passed to output choke $L_0$ and to the load. During this stage, the choke current $i_L$ is rising. At the same time, magnetizing current begins to build up in the transformer primary. When the pulse at the base of transistor Q1 goes to zero, the transistor is switched off, the current $i_L$ drops, and part of the energy stored in the choke $L_0$ is transferred to the load through flywheel diode D2. At the same time, magnetizing current continues to flow through the demagnetizing winding and through diode $D_1$. Diode $D_1$ is a fast soft-recovery diode that doubles as a collector voltage clamp. Because current flows continuously through the choke coil $L_0$, output ripple is reduced to a low amplitude. To insure smooth transfer of the magnetizing current, the primary and demagnetizing winding must be tightly coupled.

The magnetizing current in the output transformer of the forward converter flows only in one direction, and thus the core is unilaterally rather than bilaterally magnetized. The typical B/H hysteresis curves of FIG. 2A show the steady state condition of the transformer core in the circuit of FIG. 1 under normal load, and the B/H hysteresis curves of FIG. 2B show the transient condition which occurs in the presence of a sudden rise in load. In most cores the situation is even worse, since the flux does not quite reset to zero but to some "remnance flux" which may be as much as one quarter of the saturation flux.

In the prior art forward converter of FIG. 1, the flux density B of the transformer swings between zero and $\frac{2}{3} B_{SAT}$. In accordance with the present invention, a core bias winding is used which biases the core away from $B_{SAT}$, and which enables both halves of the core operating area to be used, as shown in FIG. 2C. This increases core efficiency and permits smaller cores to be used as compared with the prior art forward converters.

The forward converter of the present invention, with fixed core bias, also has an advantage over the prior art forward converters in that duty cycle dynamics do not affect the resetting effectivity in the converter of the present invention, as is the case in the prior art converters.

Figure 3:
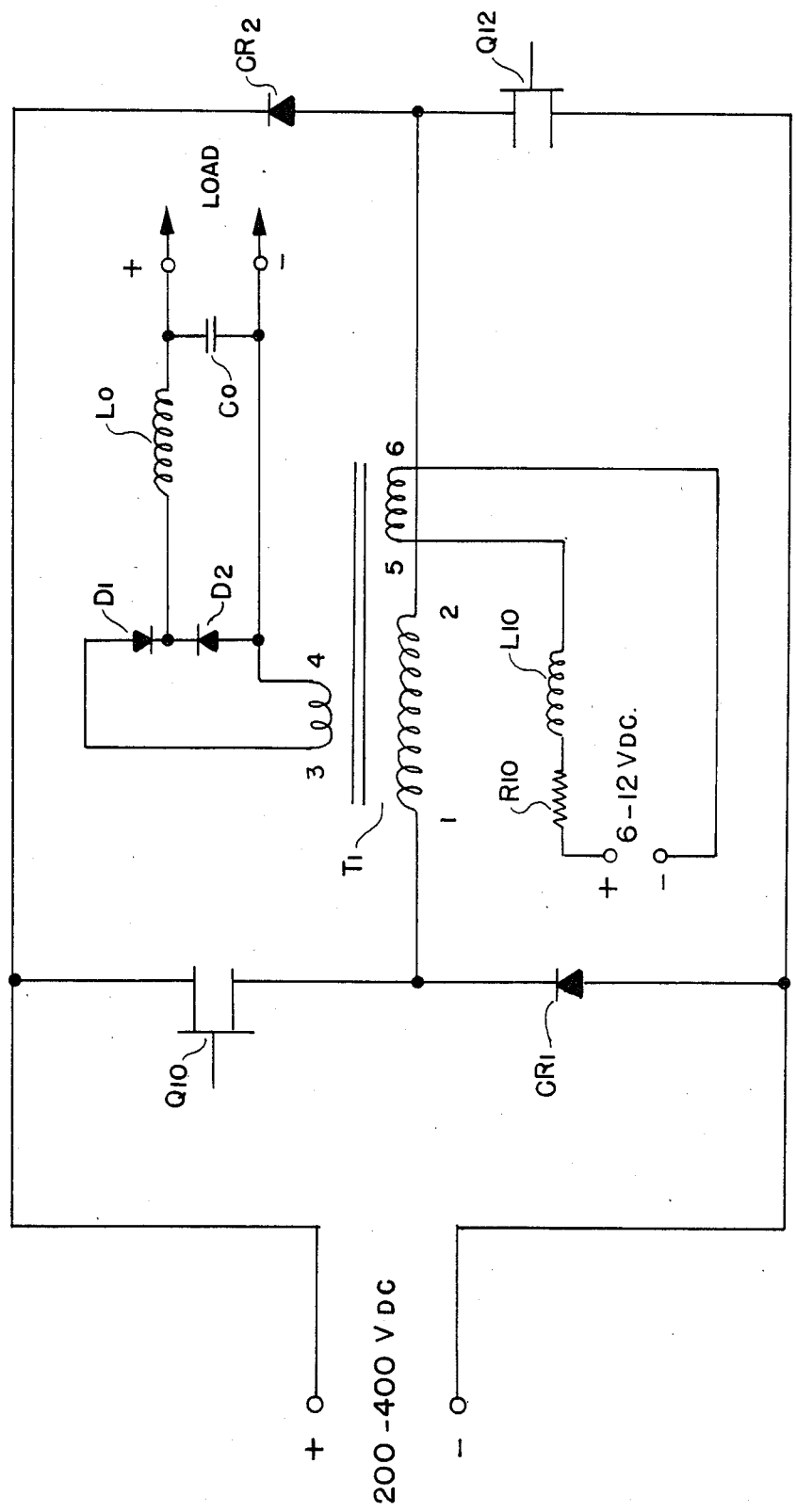
FIG. 3 is a circuit diagram of a modified forward converter in accordance with one embodiment of the present invention.

A forward converter incorporating the features of the present invention is shown in FIG. 3.

The circuit of FIG. 3 includes a transformer T1 having a primary winding 1-2, and a secondary winding 3-4. A field effect transistor (FET) Q10 connects the terminal 1 of the primary winding to one side of a 200–400 VDC voltage source; and a field effect transistor Q12 connects the other terminal 2 of the primary winding to the other side of that source. Diodes CR1 and CR2 connect the field effect transistors Q10 and Q12 respectively to the opposite sides of the source. Transformer T1 has a secondary winding 3-4 which is connected through diodes D1 and D2, and through choke coil $L_0$ to the output terminals, which are bridged by the capacitor C0. The output circuit is similar to the output circuit of the forward converter of FIG. 1.

In accordance with the present invention, a bias winding 5-6 is wound on the transformer core, and is connected to a biasing voltage source of 6–12 VDC through a choke coil L10 and resistor R10. This source may have other voltage values, however, the 6–12

VDC range is desirable since such voltages may be conveniently derived.

In the operation of the circuit of FIG. 3, the field effect transistors Q10 and Q12 are turned on simultaneously to achieve up to a 50% duty cycle core reset through the diodes CR1 and CR2. The small bias winding 5.6 is provided so that both halves of the core operating area of the B/H hysteresis curve may used, as shown in FIG. 2C.

Resistor R10 sets the bias current, and inductance coil L1 forces the bias current to be fairly constant over large alternating current voltage swings in the primary and secondary windings of transformer T1.

The circuit of FIG. 3 may be one-half of a double forward converter to which a second like converter is driven 180° out of phase with the illustrated converter and feeds the same output circuit. This serves to reduce the ripple current in the output choke $L_0$ by 50%. The same bias supply may be used for both transformers in the double forward converter, that is, the two bias windings may be connected in series across a common bias supply.

The 6-12 volt bias supply may be derived from a winding on the core so as to provide more bias at high line voltages than at low line voltages. This is desired, to achieve more bias at the high line voltages in order to insure against core saturation in dynamic situations for full 50% duty cycle.

It will be appreciated that the concept of the invention may be applied both to the single forward converter, such as shown in FIG. 3, or to the double forward converter referred to above.

Figure 4:
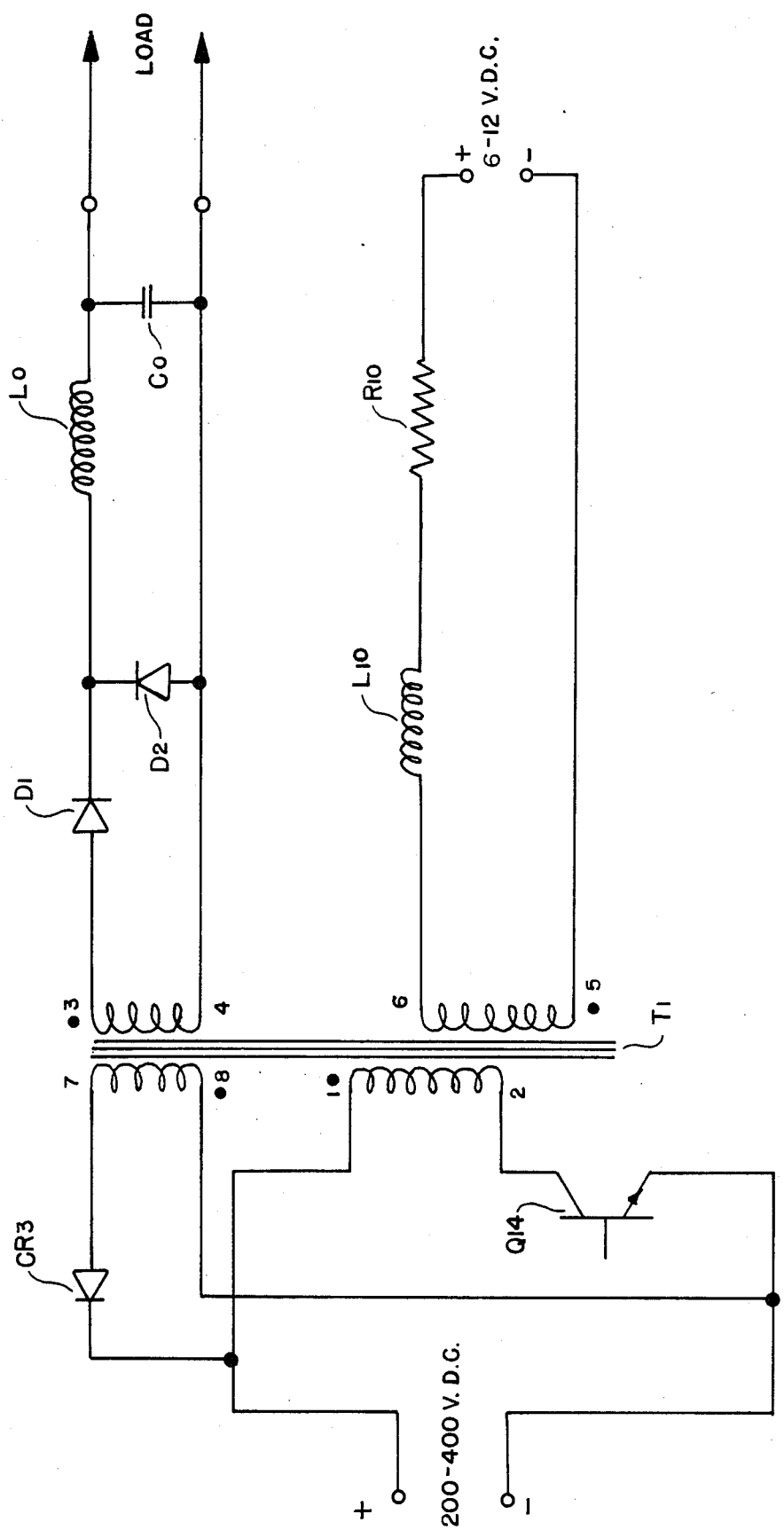
FIG. 4 is a circuit diagram of a modified forward converter in accordance with a second embodiment of the invention.

It will also be appreciated that the concept of the invention may be incorporated not only into the circuit of FIG. 3 in which the increased flux in the transformer $T_1$ is reset through the same winding using two transistors Q10 and Q12, and two diodes CR1 and CR2; or through a separate winding 7-8 as shown in FIG. 4 using but one transistor Q14 and one diode CR3.

The power transistors Q10 and Q12 of the circuit of FIG. 3 are FET's. However, they may be bipolar, and/or more than one transistor paralleled together, or any other appropriate type of switch which may be on either side of the main primary winding.

The invention provides, therefore, an improved forward converter which includes a bias winding of the transformer for more efficient utilization of the transformer core.

It will be appreciated that while particular embodiments of the invention have been shown and described, modifications may be made. It is intended in the claims to cover all modifications which come within the spirit and scope of the invention.

I claim:

1. A switched power supply of the forward converter type including a transformer having a saturable magnetic core and having primary and secondary windings wound on said core; an input circuit adapted to be connected to a direct current source, said input circuit being connected to the primary winding and including a series-connected switching means for causing current to flow in the primary winding so long as the switching means is closed, the current flow in said primary winding tending to magnetize the core towards one of its saturation levels; an output circuit connected to the secondary winding; a third winding wound on said core; and a direct current bias circuit connected to said third winding for introducing a direct bias current to said third winding which tends to magnetize the core away from said one of its saturation levels.

2. The switched power supply defined in claim 1, and which includes rectifying means and filter means included in said output circuit for producing a direct current voltage at the output of the power supply.

3. The switched power supply defined in claim 1, and which includes a choke coil included in said bias circuit connected in series with said third winding to maintain the bias current substantially constant in the presence of relatively large alternating current swings in the primary and secondary windings.

4. The switched power supply defined in claim 1, in which said switching means comprises a first field effect transistor connecting one side of the primary winding to one side of said direct current source, and a second field effect transistor connecting the other side of said primary winding to the other side of said direct current source.

5. The switched power supply defined in claim 4, and which includes a first diode connected with a first polarity between said first field effect transistor and the other side of said direct current source, and a second diode connected with opposite polarity between said second field effect transistor and said one side of said direct current source.

6. The switched power supply defined in claim 1, in which biasing current for the biasing circuit is derived from a bias source including a winding on the transformer.

* * * * *